United States Patent [19]

Dewar et al.

[11] Patent Number: 4,461,085
[45] Date of Patent: Jul. 24, 1984

[54] GONIOMETER

[75] Inventors: Michael E. Dewar, London; Kenneth E. Ackerley, East Croydon, both of England; Lawrence E. Carlson, Boulder, Colo.

[73] Assignee: National Research Development Corporation, London, England

[21] Appl. No.: 360,481

[22] Filed: Mar. 22, 1982

[30] Foreign Application Priority Data

Mar. 27, 1981 [GB] United Kingdom ................. 8109663

[51] Int. Cl.$^3$ .............................................. G01B 5/20
[52] U.S. Cl. ................. 33/174 L; 33/174 D; 128/782
[58] Field of Search ......... 33/174 D, 174 L, 175–177, 33/DIG. 13; 128/774, 781; 338/47

[56] References Cited

U.S. PATENT DOCUMENTS 1,147,722 7/1915 Hegarot .............................. 33/176
3,991,745 11/1976 Yoslow et al. ............... 33/174 D X

FOREIGN PATENT DOCUMENTS 101649 of 1910 United Kingdom ................. 33/177

Primary Examiner—Harry N. Haroian
Attorney, Agent, or Firm—McAulay, Fields, Fisher, Goldstein & Nissen

[57] ABSTRACT

A goniometer for use in measuring angular movements of joints of a human or animal body comprises an elongate body and a plurality of mercury-in-rubber sensors extending longitudinally of the body at locations spaced from one another around the body. The electrical resistance of the sensors varies with varying strain thereof, and a circuit is connected to the sensors for converting variations in the resistance into a measure of the relative angular disposition of the ends of the body.

10 Claims, 1 Drawing Figure

GONIOMETER

FIELD OF THE INVENTION

This invention relates to a goniometer, and in particular to a goniometer for use in measuring angular movements of joints of a human or animal body.

BACKGROUND OF THE INVENTION

It is frequently desired to measure the angular movements of a joint of the body, for example in studying changes in behaviour of a joint after an operation. At present no convenient way exists of doing this, and an object of the invention is to remedy this.

BRIEF DESCRIPTION OF THE INVENTION

According to the invention there is provided a goniometer comprising an elongate body, a plurality of sensors extending longitudinally of the body, at locations spaced from one another around the body, the sensors being such that an electrical property thereof varies with varying strain thereof, and a circuit connected to the sensors for converting variations in the said electrical property into a measure of the relative angular disposition of the ends of the body.

BRIEF DESCRIPTION OF THE DRAWINGS

The drawing is a diagrammatic perspective view of an embodiment of the invention.

DETAILED DESCRIPTION OF ILLUSTRATED EMBODIMENTS

Figure 1:
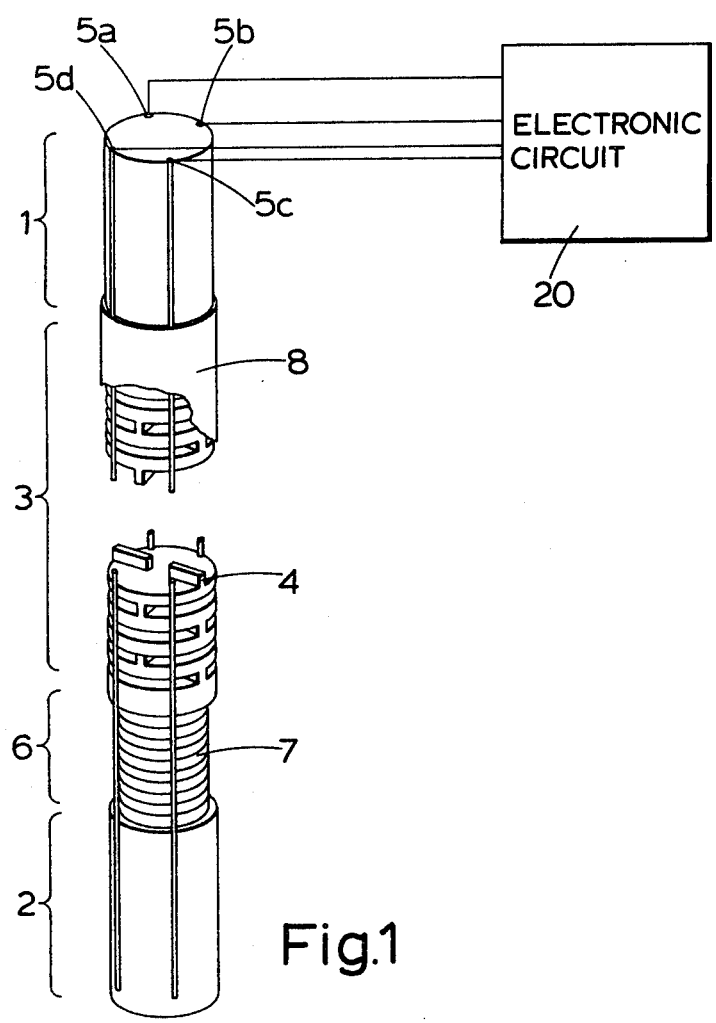

The goniometer illustrated comprises a rod of thermoplastic material 10 mm in diameter and 240 mm in length. 50 mm lengths 1 and 2 at either end remain rigid and are the sections which are attached to the parts of the body whose rotations are to be measured. The central section 3 of the rod is made flexible by a large number of slots cut into it. The slots are cut in pairs across the rod from opposite sides, each pair leaving a web 4 across the diameter. Adjacent pairs of slots are cut at 90° to each other. This makes the rod very flexible to bending forces in any direction but resistant to torsion about its longitudinal axis. One of the end sections 2 is separate from the rest of the rod and is able to rotate about its long axis.

Transducer elements are provided in the form of four mercury-in-rubber gauges 5a, 5b, 5c and 5d. Each gauge consists of a fine tube of rubber (either natural or synthetic) or similar material, filled with mercury. To protect the gauges the rod is covered with a thin latex tube, of which a portion is shown. The gauges lie in grooves cut along the length of the rod and equally spaced around its circumference. They are attached to the end sections 1 and 2 of the rod and bending in the flexible central section 3 causes differing length changes in the gauges, thereby changing their electrical resistance. From these changes the angle through which the rod bends and the plane in which it does so is derived. This can be achieved by an appropriate electronic circuit 20 connected to the gauges. Thus the ends of the gauges which terminate in section 2 can be electrically connected together, and circuitry connected to the other ends of the gauges determines the difference between the resistance of gauges 5a and 5c, and the difference between the resistance of gauges 5b and 5d.

If bending takes place about an axis perpendicular to the plane containing gauges 5a and 5c, the length of one of those gauges increases (and consequently its resistance increases) and the length of the other decreases (and consequently its resistance decreases). The gauges 5b and 5d are unchanged in length. The changes in the gauges 5a and 5c are interpreted by the electronic circuit as bending of a given amount about the above mentioned axis. The gauges 5b and 5d act correspondingly in the case of bending about an axis perpendicular to the plane containing them. Bending about an axis intermediate the two aforementioned axes causes measurement of the two components of that bending about those two axes. Any bending of the rod in which the two end sections remains parallel leaves the lengths of the gauges unchanged, and the goniometer is thus unaffected by linear movements of the two ends.

For a 15 mm length 6 adjacent the end section 2 the gauges do not lie in grooves but lie on the surface thereof. In the drawing the gauges are shown as extending over this section parallel to the longitudinal axis of the goniometer, but it is preferred that the gauges should be given a spiral twist, for example through 180°, over the length 6. The length 6 is designed to measure rotation, and in order to assist this the length is preferably out into a plurality of discs 7 each of which has a central aperture, the discs being carried on a central rod (not shown).

If a torsional force is exerted on the goniometer, the end section 2 rotates about its longitudinal axis with respect to the sections 1 and 3. This causes the gauges to spiral round the length 6 (or, where those gauges already lie in the form of a spiral, causes the angle of that spiral to change), thereby increasing the length of each gauge by the same amount. The electronic circuit 20 connected to the gauges detects this increase in resistance and interprets it as torsional movement through a given angle.

Various modifications may be made to the goniometer described above. For example, bending may be measured using just two gauges disposed at 90° to one another. Torsional movement can be detected by a third gauge which is free to spiral around the rod as torsional movement occurs. Another possibility is to use just two gauges at 90° to one another to detect both bending and torsional movement, this being achieved by tapping the gauges at the junction between sections 3 and 6 so as to be able to determine separately the components of electrical resistance attributable to the portions of the gauge on either side of the tapping points.

The output of the electronic circuit referred to above may be fed to any suitable means for recording and/or displaying the output in a suitable form. For example, the output of the electronic circuit may be displayed on an oscilloscope or on a pen-and-paper recorder.

We claim:

1. A goniometer comprising an elongate body having at least a main portion which is flexible but resistant to torsion, a plurality of sensors each attached to the elongate body adjacent both ends of said portion and extending longitudinally of the body, at locations spaced from one another around the body, the sensors being extensible and such that an electrical property thereof varies with varying length thereof, and a circuit connected to the sensors for converting variations in said electrical property into a measure of the relative angular disposition of the ends of the body.

2. A goniometer according to claim 1, wherein the elongate body comprises non-flexible end sections and said main portion is intermediate the end sections, the sensors being secured at one end to one of the end sections and at the other end to the other end sections.

3. A goniometer according to claim 2, wherein the said flexible section has a plurality of pairs of diametrically opposed slots formed thereon, the pairs of slots being spaced longitudinally from one another along the length of the said flexible section.

4. A goniometer according to claim 3, wherein adjacent pairs of slots are orientated at 90° with respect to each other.

5. A goniometer according to claim 1, wherein the sensors are in the form of flexible tubes filled with mercury, the electrical resistance of the sensors varying with varying length thereof.

6. A goniometer according to claim 1, wherein four sensors are arranged 90° apart from one another around the said body.

7. A goniometer according to claim 6, wherein the said circuit is arranged to determine the difference in resistance between gauges 180° apart, thereby to determine bending of the said body.

8. A goniometer comprising an elongate body, a plurality of sensors extending longitudinally of the body, at locations spaced from one another around the body, the sensors being such that an electrical property thereof varies with varying strain thereof, and a circuit connected to the sensors for converting variations in said electrical property into a measure of the relative angular disposition of the ends of the body, said elongate body comprising non-flexible end sections and a flexible section intermediate said end sections, said sensors being secured at one end to one of the end sections and at the other end to the other of said end sections, said one of said end sections being free to rotate relative to said flexible section.

9. A goniometer according to claim 8, which comprises a further section intermediate the flexible section and the rotatable end section, and wherein the sensors run in grooves formed in the surface of the flexible section but do not run in grooves over the said further section, whereby the sensors are free to spiral around the said further section upon rotation of the said rotatable end section, the said spiralling serving as a measure of torsion of the said body.

10. A goniometer according to claim 8, which comprises at least two sensors arranged 90° apart from one another around the said body to detect bending, and a means other than the said two sensors for detecting torsion.

* * * * *